D. H. CASSEL & G. W. ZINT.
KNIFE-SCOURING PAN.
No. 189,081. Patented April 3, 1877.
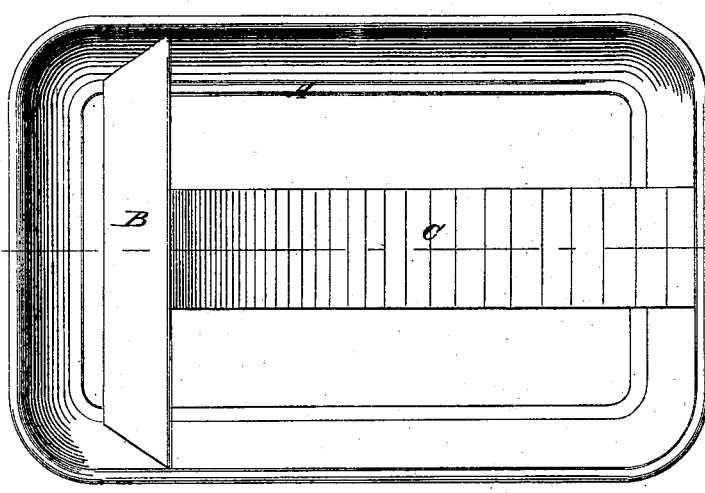
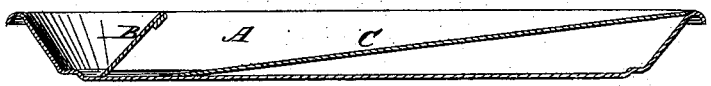

UNITED STATES PATENT OFFICE.

DAVID H. CASSEL AND GEORGE W. ZINT, OF CRESTLINE, OHIO.

IMPROVEMENT IN KNIFE-SCOURING PANS.

Specification forming part of Letters Patent No. 189,081, dated April 3, 1877; application filed February 26, 1877.

*To all whom it may concern:*

Be it known that we, DAVID H. CASSEL and GEORGE W. ZINT, of Crestline, in the county of Crawford and State of Ohio, have invented a new and Improved Knife-Scouring Pan, of which the following is a specification:

In the accompanying drawing, Figure 1 represents a top view, and Fig. 2 a vertical longitudinal section of our improved knife-scouring pan.

Similar letters of reference indicate corresponding parts.

The object of this invention is to provide an improved pan for the convenient scouring of knives and forks; and it consists of a sheet-metal dish or pan with inclined center plane or rest-piece for the knives and forks, and a front partition, providing a receptacle for the scouring-powder.

In the drawing, A represents a pan of sheet metal and suitable size, which is provided with an inclined plane, C, that extends longitudinally from the bottom of the pan to the rim, forming a bridge or rest, on which the knife or fork is placed for being exposed to the action of the scouring-powder. The spaces at both sides of the inclined rest-piece C take up the spent powder and dirt. A lateral inclined partition, B, in front of the lowermost end of the inclined rest-piece C, forms, with the end wall of the pan, a receptacle for the scouring-powder, which may be sand, pulverized brick, or any other substance.

The scouring-powder is taken up and applied directly to the knife or fork, bringing always a fresh quantity in contact with the same as the spent powder is dropped from the rest-piece into the spaces at both sides of the same.

The scouring of knives and forks is by this pan accomplished in a neater and more convenient manner, the pan forming a clean and readily-available device for that purpose.

Having thus described our invention, we claim as new and desire to secure by Letters Patent—

A scouring-pan for knives and forks, consisting of a dish or pan, with longitudinal inclined plane or rest-piece, and a lateral partition in front of the same, forming a receptacle for the scouring-powder, substantially in the manner described, and for the purpose herein specified.

DAVID H. CASSEL.
GEORGE W. ZINT.

Witnesses:
W. E. McGUIRE,
SAMUEL WILSON.